United States Patent [19]

Schiff

[11] Patent Number: 4,636,586

[45] Date of Patent: Jan. 13, 1987

[54] SPEAKERPHONE WITH ADAPTIVE CANCELLATION OF ROOM ECHOES

[75] Inventor: Leonard N. Schiff, Lawrenceville, N.J.

[73] Assignee: RCA Corporation, Princeton, N.J.

[21] Appl. No.: 778,314

[22] Filed: Sep. 20, 1985

[51] Int. Cl.⁴ .............................................. H04B 15/00
[52] U.S. Cl. .................................... 379/390; 379/411; 381/71; 381/94
[58] Field of Search ............. 179/81 B, 100 L, 18 BC; 381/71, 94

[56] References Cited

U.S. PATENT DOCUMENTS

| | | | |
|---|---|---|---|
| 4,087,654 | 5/1978 | Mueller | 179/170.2 |
| 4,118,601 | 10/1978 | Yeap | 381/103 |
| 4,225,754 | 9/1980 | Bernard et al. | 179/81 B |
| 4,480,333 | 10/1984 | Ross | 381/71 |
| 4,497,980 | 2/1985 | Gorman et al. | 179/81 B |
| 4,594,695 | 6/1986 | Garconnat et al. | 367/135 |

FOREIGN PATENT DOCUMENTS 2088951  6/1982  United Kingdom ................. 381/71

OTHER PUBLICATIONS

Article–"Echo Cancellation in Speech and Data Transmission" by: D. G. Messerschmitt, published at pp. 293–297, to the IEEE Journal of Selected Areas in Communications, vol. SAC-2, No. 2, Mar. 1984.

Primary Examiner—Gene Z. Rubinson
Assistant Examiner—R. Vaas
Attorney, Agent, or Firm—Joseph S. Tripoli; Robert L. Troike; William H. Meise

[57] ABSTRACT

An arrangement for generating an electrical audio signal in response to a sound signal applied to a microphone in a reverberating room removes the reverberations with an adaptive filter. The filter learns or adapts so as to cancel the room echoes by receiving both the audio signal affected by reverberation and a clean audio signal from a highly directional local-acting microphone placed near the source of the sound. The signal to be filtered is applied to a transversal filter including a tapped delay line having variable taps or multipliers to produce incrementally delayed multiplied samples. The multiplied samples are summed, and the sum signal is subtracted from the clean signal to produce a difference signal. A $\mu P$ is programmed to iteratively calculate the effects of changes to the tap values and to select tap values which tend to reduce the magnitude of the difference signal. When the filter is converged, the difference signal is near zero. At this time, the filtered signal and the clean signal are similar, and therefore the filter characteristic removes the effect of reverberation. The tap values are then fixed, and the signal with room reverberations can be made clean by the adapted filter.

10 Claims, 3 Drawing Figures

SPEAKERPHONE WITH ADAPTIVE CANCELLATION OF ROOM ECHOES

This invention relates to telephones and more particularly to an apparatus and method for adaptively cancelling that portion of the signal produced by a speakerphone (hands-free telephone) which is attributable to room echoes.

BACKGROUND OF THE INVENTION

Speakerphones or hands-free telephones include a loudspeaker associated with the instrument which transmits into the vicinity of the telephone instrument an audio signal representing the sound from a telephone at the other end of the telephone wire, and also includes a microphone which picks up sounds produced by a local speaker for transmission to a remote telephone. Ordinarily, a speech detector selects either the loudspeaker mode of operation or the microphone mode of operation, so as to avoid creation of echoes on the line due to the microphone picking up the sound generated by the loudspeaker.

It has been noticed that the sound produced at the far end of a telephone line in response to the sound picked up by the microphone of a speakerphone has an undesirable reverberation, such that the sound seems to come from the inside of a "rain barrel". This rain barrel effect is caused by single or multiple echoes of the voice of the local speaker from the walls of the room in which the sending end speakerphone is located. It is well known in the telephone art to use cancellation techniques to suppress echoes in the electrical transmission which arise due to multiple transmission paths or loops attributable to insufficient isolation in coupling hybrids as described for example in the paper Echo Cancellation in Speech and Data Transmission, by D. Messerschmitt, published at pp. 283–297 of the IEEE Journal on Selected Areas in Communication, VOL. SAC-2, No. 2, March 1984. However, the "rain barrel" effect referred to above occurs in the signals entering the microphone, as opposed to problems in the electrical transmission path. Thus, the solutions mentioned in the Messerschmitt paper have no applicability to the problem to which the invention is directed.

U.S. Pat. No. 4,118,601 issued Oct. 3, 1978, to Yeap describes a scheme for interposing a bank of filters and attenuators in the sound path of a audio loudspeaker sound system located in a room and to use white noise from a noise generator to set the equalizer to produce a substantially flat frequency response in spite of the room echoes. Such a scheme is directed towards the generation of a substantially constant response as a function of frequency of the audio portion of a system when driven by a substantially constant amplitude electrical signal. However, Yeap does not suggest how to generate an electrical signal corrected for echoes in the generating audio signal.

It would be desirable to generate an electrical signal representative of an audio signal in such a fashion that the electrical signal does not include portions representative of echoes occurring in the room in which audio signals were generated.

SUMMARY OF THE INVENTION

A method for reducing the effect of room resonances on the quality of sound transmitted over an electrical transmission system including a microphone and a handset transmitter includes the steps of speaking into the handset transmitter at a location in the room so that a clean audio signal is generated by the transmitter which is unaffected by the room resonances, and so that a corresponding audio signal is generated by the microphone which is affected by the room resonances. The corresponding audio signal is delayed to produce a plurality of incrementally delayed samples of the corresponding audio signal. Each of the incrementally delayed corresponding audio signals are multiplied by one of a plurality of multiplying factors or values to produce a plurality of multiplied signals. The multiplied signals are added together to produce a sum signal, and the sum signal is subtracted from the clean audio signal to produce a difference signal. Each of the multiplying factors or values is adjusted in order to reduce the difference signal toward a magnitude of zero, whereby the sum signal approximates the clean audio signal. The values of each of the plurality of multipliers is then fixed, whereby the sum signal is the corresponding audio signal corrected for the room resonances. Speech directed into the microphone thereafter produces a sum signal which is corrected for the room resonances, and the sum signal may be utilized as the output of the speakerphone. An apparatus adapated for use in conjunction with the method includes a telephone handset with a transmitter adapted for receiving speech to produce a clean audio signal and a microphone adapted for receiving corresponding audio signal affected by room resonances. A delay is coupled to the microphone for delaying the corresponding audio signal, and a controllable tap arrangement is coupled to the delay for multiplying each of the delayed signals by one of a plurality of tap values to form multiplied corresponding signals. A summer is coupled to the controllable taps for summing together the multiplied corresponding signals to form a sum signal. A subtractor is coupled to the summer and to receive the clean audio signal, to produce a difference signal. A controller is coupled to the subtractor and to the controllable taps for, in a learning mode of generation, selecting the values of each of the plurality of tap values in such a manner as to reduce the magnitude of the difference signal, and, in a normal mode of operation following the learning mode, for maintaining the value of each of set plurality of tap values at the selected value.

DESCRIPTION OF THE INVENTION

Figure 1:
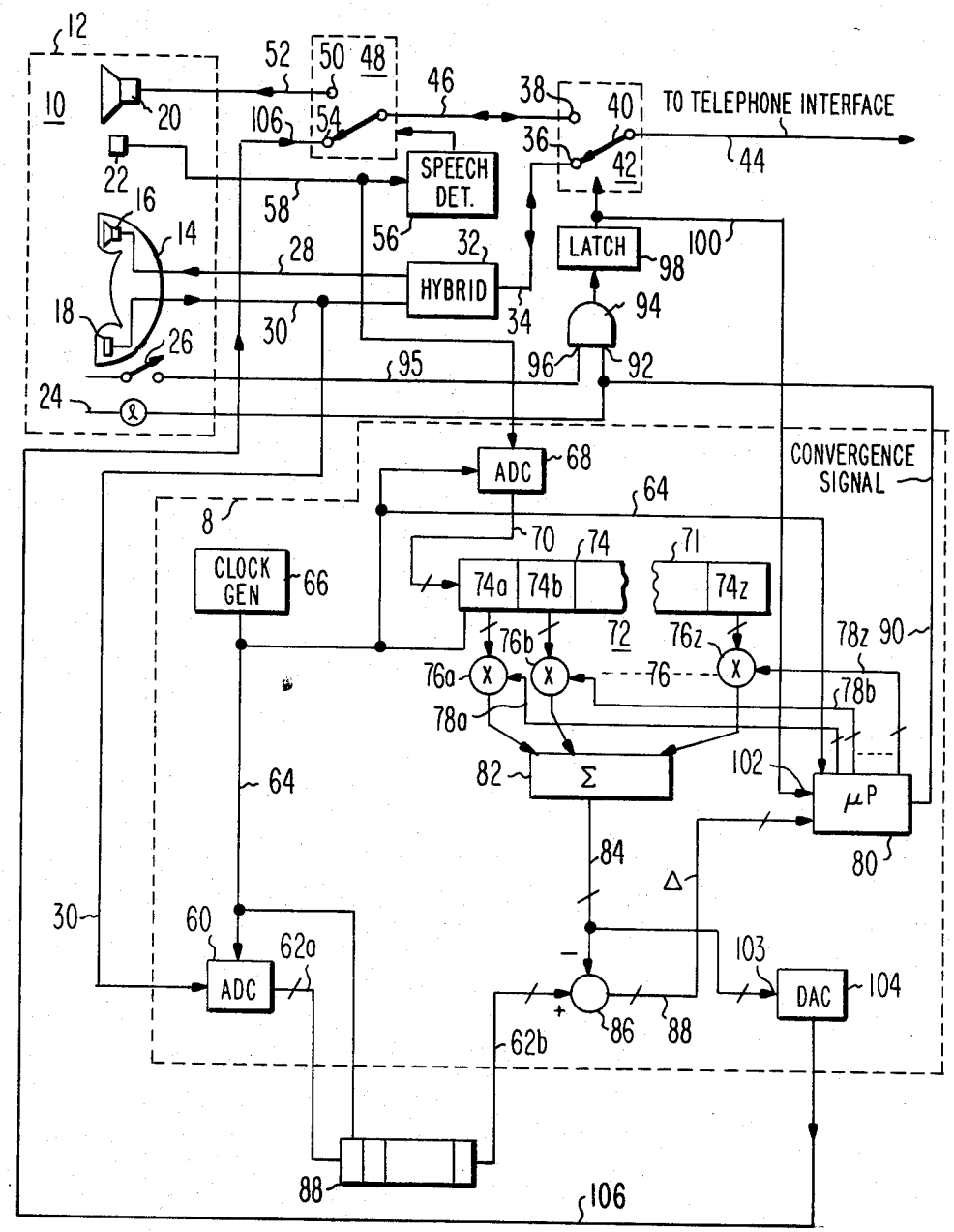
FIG. 1 is a block diagram of a speakerphone embodying the invention.

FIG. 1 is a simplified block diagram of a portion of a speakerphone including circuitry for reducing the effect of room echoes. At upper left of FIG. 1, a room 10 having walls 12 contains a standard telephone handset 14 including a receiver 16 and a transmitter 18. Also within room 10 are a speakerphone loudspeaker 20 and a speakerphone microphone 22. Associated with handset 14 is a convergence lamp 24 which indicates convergence, and a mode switch 26 which allows switching between handset and speakerphone modes of operation, all as described below. Receiver 16 and transmitter 18 of telephone handset 14 are each connected by conductor pairs 28 and 30, respectively, to a standard telephone hybrid 32 which acts as a directional coupler to produce bi-directional telephone signals on a conductor 34. In keeping with telephone practice and for simplicity, conductor pairs are illustrated in the FIGURES, and are hereafter referred to, as single conductors or lines. Similarly, switches and relays for conductor pairs are described as through handling a single conductor. Conductor 34 is connected to a terminal 36 of a single pole, double throw controllable switch or relay 42. Relay 42 is normally in the position illustrated, so that the handset is normally connected to a telephone line 44.

In the alternate position of relay 42, wiper 40 contacts terminal 38 to connect telephone line 44 by way of a conductor 46 to a further single pole double throw relay 48. Terminal 50 of relay 48 is connected by way of conductor 52 to speakerphone loudspeaker 20, and terminal 54 of relay 48 is connected in a manner described below to receive signals originating with microphone 22. As known in the telephone art, microphone 22 is also connected by a conductor 58 to a speech detector 56 which detects the presence of a certain level speech by a speaker or talker within room 10 and controls the position of relay 48 so that loud sounds entering microphone 22 cause relay 48 to assume the position illustrated to connect the microphone to telephone line 44 for transmission of signals to a distant receiver. In the absence of receipt of signals by microphone 22 above the threshold level, loudspeaker 20 is connected by relay 48 to telephone line 44 for receiving signals from a distant location and for generating sound within room 10 in response thereto.

As mentioned above, the walls of the room in which the microphone such as 22 of a speakerphone is located cause the sound produced by a talker within the room to reverberate or reflect from the walls one or more times. The reflected sound signals enter microphone 22 together with the direct-path sound signals from the talker to the microphone, resulting in the rain barrel effect. The remainder of the arrangement of FIG. 1 is an adaptive filter which can learn or adapt itself to the echoes produced by a talker within room 10, together with circuits for indicating that adaptation is complete and for allowing use of the adapted signal. In order to initiate adaptation, the talker within room 10 speaks into transmitter 18 of handset 14 in such a fashion that the sound can be received by microphone 22. Because of the directional characteristics of transmitter 18, a substantially clean audio signal is generated on conductor 30 unaffected by room echoes, and a corresponding audio signal is produced on conductor 58 by microphone 22 which is affected by room resonances. The clean audio signal is applied over conductor 30 to an analog-to-digital converter (ADC) 60 which produces digitized clean audio on a conductor 62a at a rate controlled by clock signals applied over a conductor 64 from a clock generator 66. Similarly, corresponding audio signal from microphone 22 is applied over conductor 58 to an ADC 68 which produces a digitized corresponding audio signal on a conductor 70 at the rate of clock 66. Each sample of the digital clean or corresponding audio signal includes a plurality of bits, each carried on a separate conductor. For simplicity, such sets of conductors are indicated in the drawing by a slash mark associated with the conductor, and sets of conductors are hereinafter referred to in the singular. In order to remove the effect of room resonances from the corresponding audio signal produced by microphone 22, the digitized corresponding signal on conductor 70 is applied to a transversal filter designated generally as 72.

Digitized corresponding audio signals are applied from ADC 68 by way of conductor 70 to a clocked delay line 74 of filter 72. Each stage ($72a$, $72b$ ... $72z$) of delay line 74 is associated with one multiplier of a set of multipliers designated generally as 76. Thus, the first stage $74a$ of delay line 74 is coupled to a multiplier $76a$, the second stage $74b$ is coupled to a multiplier $76b$, and so on through the delay line until the last stage $74z$ is coupled to a multiplier $76z$. While designators a-z have been used for the stages of delay 74, the number of stages is not limited by the number of letters in the alphabet but rather is established by the clock rate at which the delay line operates and by the maximum expected duration between the clean audio and the last significant echo entering microphone 22. Each of the multipliers 76 is connected to a microprocessor ($\mu$P) 80 by a conductor of conductor set 78. For example, multiplier $76a$ is connected by a conductor $78a$ to microprocessor 80, and multiplier $76z$ is connected to microprocessor 80 by conductor $78z$. Each multiplier 76 multiplies the signal on its corresponding delay line stage 74 by the multiplier value or tap value coupled by its associated conductor 78 from microprocessor 80. The resulting multiplied or tap values are applied from each of multipliers 76 to a summing circuit 82 which adds together the multiplied values to produce on a conductor 84 a sum signal which is the filtered output of transversal filter 72 in response to the corresponding audio signal. The filtered corresponding audio signal on conductor 84 is applied to the inverting input terminal of a subtractor 86. The digitized clean audio signal from ADC 60 is applied by way of conductors $62a$ and $62b$ and a clocked delay line 88 to the noninverting input terminal of substractor 86. Delay line 88 has a delay equal to the average delay of the signals filtered by transversal filter 72 so that the delayed clean audio signal and the filtered corresponding audio signal arriving at subtractor 86 are time coincident. Subtractor 86 produces a difference signal on a conductor 88 which is applied to an input terminal of microprocessor 80. Microprocessor 80 adaptively controls the values of the multiplier or tap signals applied to the various conductors 78 as described below in order to reduce the difference signal on conductor 88 below a predetermined threshold value. When the threshold value of the difference signal is reached, microprocessor 80 produces a convergence signal on a conductor 90 to indicate that convergence is complete. When the difference signal on conductor 88 is small as a result of the adaptation of filter 72, the filtered corresponding audio signal on conductor 84 is substantially equal to the delayed clean audio signal on conductor $62b$. Consequently, filter 72 at that time has an amplitude and phase characteristic tending to cancel in the corresponding audio signal the effect of room echoes resulting from the presence of reverberating room 10 on the signal generated by microphone 22 in response to a talker.

The convergence signal on conductor 90 is applied to lamp 24 within room 10 to indicate to the talker that convergence has been achieved and the speakerphone is ready for operation. Convergence signal 90 is also applied to an input terminal 92 of an AND gate 94. Switch 26 is coupled by a conductor 95 to a second input terminal 96 of AND gate 94. When the talker decides to use the speakerphone after lamp 24 lights, switch 26 is depressed to apply a signal through enabled AND gate 94 to a latch 98. Latch 98 responds by latching a logic HIGH signal on its output conductor 100 which switches the position of relay 42 to its alternate condition, thereby connecting terminal 38, conductor 46 and terminal 54 of relay 48 to telephone line 44. The logic HIGH latch output signal on conductor 100 is also applied to an INHIBIT input terminal 102 of microprocessor 80 to stop the adaptation process and to latch the multiplier values then existing on conductors 78. Consequently, the adaptively selected values which caused filter 72 to have a characteristic which cancels the effect of room echoes for the position in the room that the talker selected become fixed, and will not change until such later time at which adaptation is again selected. Adaptation may be desired if the talker changes his position in the room, and may be initiated by operating switch 26.

The filtered audio signals on conductor 84 are applied to a digital-to-analog converter (DAC) 104 which produces an audio signal on conductor 106 which is connected to input terminal 54 of relay 48. Thus, in the arrangement of FIG. 1 the audio signal for microphone 22 is applied to terminal 54 of relay 48 by way of adapted filter 72 rather than directly. Consequently, the operation of the remainder of the telephone apparatus is similar to that of a standard speakerphone, except that room echoes have been cancelled in the signal applied to terminal 54 for coupling to telephone line 44. At the end of the call, the telephone line is disconnected by a handset hook or by switch (not illustrated) which resets latch 98.

The adaptation algorithm used by microprocessor 80 operates generally in the following fashion. During each clock cycle of clock generator 66, microprocessor 80 sequentially performs a calculation associated with each stage 74a-z of delay 74 and its associated multipliers 76a-z. Microprocessor 80 contains for this purpose an internal clock having a much higher clock rate than clock generator 66. For each of the calculations for one stage, microprocessor 80 makes a decision as to whether it will increase the value of the multiplier applied over a conductor 78 by one bit or decrease it by one bit. It does not have the option of retaining the current value of the multiplier. At the end of each cycle of clock 66, a large number of such decisions (one for each stage a-z) are stored in microprocessor 80, and it implements the changes to complete an iteration of adaptation. At the beginning of the next clock cycle of generator 66, microprocessor 80 again begins to perform the calculations, beginning with stage a and proceeding to stage z. Since microprocessor 80 is constrained to either increase or decrease by one bit the value of the multiplier of each tap, and may not leave it the same, the algorithm tends to converge slowly, but it has the advantage of simplicity. For each stage a-z, the decision as to whether to increment or decrement the multiplier value for the associated stage is based upon which of the values results in a smaller difference signal on conductor 88. For example, assume that the current value represented by the digital signal stored in stage 74a of delay line 74 is 120 and that the current value of the multiplier applied from μP 80 on conductor 78a to multiplier 76a has the value 8. Multiplier 74a produces the product of $8 \times 120 = 960$, which value is being summed by summer 82 together with other values from multipliers 74b-z to produce a sum signal on conductor 84. As mentioned above, the sum signal on conductor 84 is subtracted from the clean audio signal. Microprocessor 80 may select as a multiplier for stage 74a for the next iteration only the values of 7 or 9. In order to make this decision, microprocessor 80 decreases the multiplier on conductor 78a to the value 7 and stores in an internal memory the resulting value of difference signal ($\Delta_x$) from conductor 88. It also increments the multiplier value on conductor 78a to the value 9 and again stores the difference signal ($\Delta_y$). The two difference signals are compared, and the incremented or decremented multiplier value (i.e. 7 or 9) for which the difference signal was smaller is stored so that it may later be substituted for the value 8. The value 8 (the current value) continues to be applied over conductor 78a during the remainder of the calculations on stages b-z during the current iteration.

Figure 2:
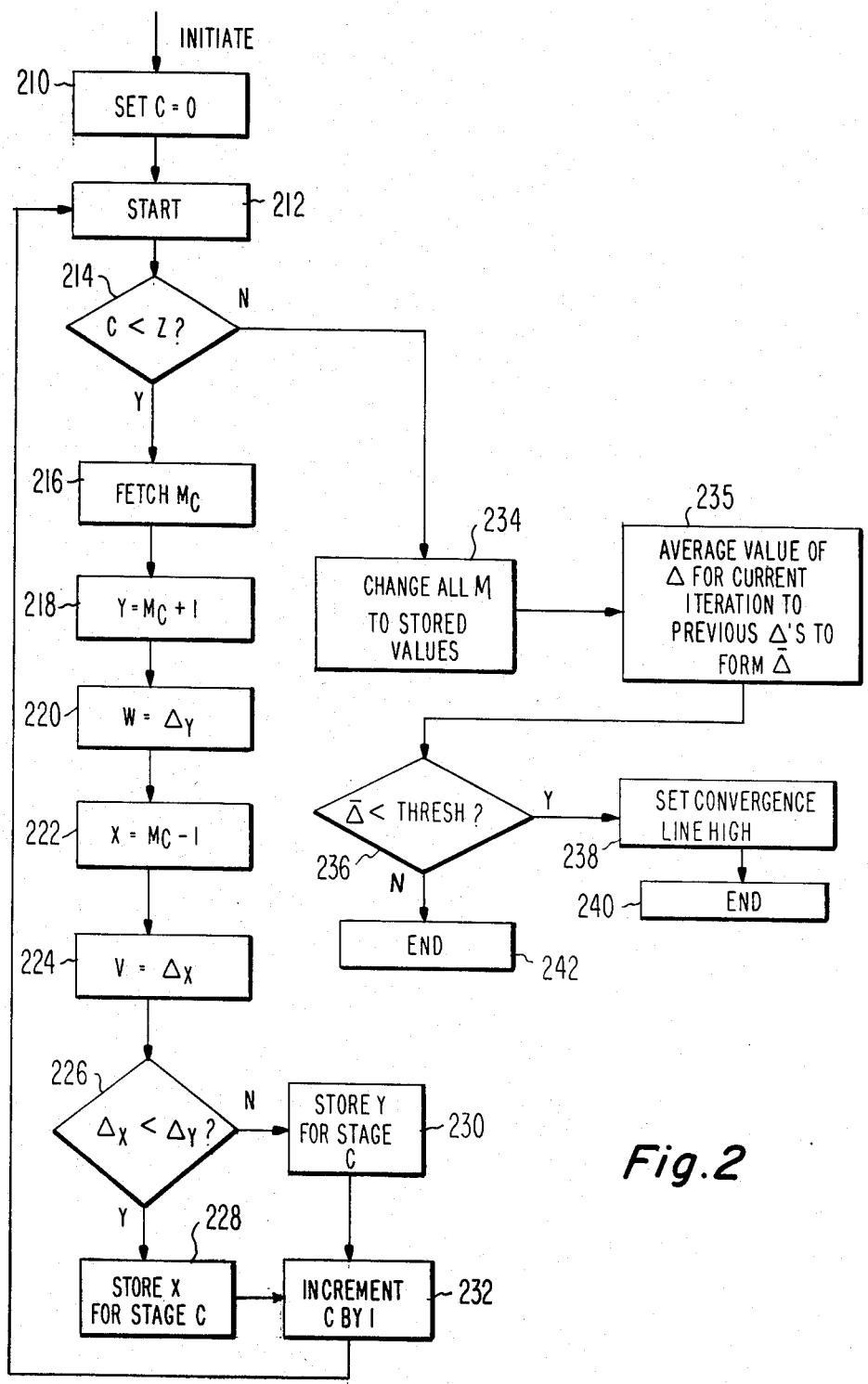
FIG. 2 is a flow chart of a tap multiplier adaptation algorithm.

FIG. 2 is a flow chart of an adaptation algorithm such as that described above, which may be used by the microprocessor in the arrangement of FIG. 1. In the flow chart of FIG. 2, a cycle of adaptation is initiated by a clock signal (from clock generator 66) applied to a block 210. Block 210 represents the setting to zero of the value of C (representing one of the stages a-z on which calculations are currently being made) in a C register (not illustrated) of the μP. The adaptation proceeds past a START block 212 to a block 214 in which C is compared with z, the last stage to be processed during any interation. If C is less than z, the cycle or iteration of adaptation is not complete and the process proceeds to block 216, which fetches from memory the value $M_C$, which is the current multiplier value for the stage C (i.e. the value selected during the previous iteration). In block 218, the incremented multiplier value Y is set equal to $M_C + 1$ which is applied to stage C as a multiplier, and block 220 sets W equal to the corresponding difference signal $\Delta_y$ produced on conductor 88 (FIG. 1) as a result of the incremented multiplier Y. The process proceeds to block 222 which generates a decremented value X of multiplier equal to $M_c - 1$ and applies it as a multiplier to stage C. The next block 224 sets V equal to the value $\Delta_x$ of the difference signal appearing on conductor 88 as a result of the use of decremented multiplier X. In block 226, the difference signals $\Delta_x$ and $\Delta_y$ are compared in magnitude, and either X or Y is selected for storage depending upon which of the difference signals is smaller. In either case, the magnitude of the current stage C stored in the C register (not illustrated) is incremented by one in block 232, and a loop is closed by a return to start block 212. The process is repeated for C=2, 3 . . . z. The loop so far described continues to select and store an incremented or decremented multiplier value for each stage until the last stage z is reached. When the multiplier for stage z has been selected, the no (N) output of stage 214 is selected, which indicates that a complete set of multiplier values has been selected by adaptation in readiness for the next iteration. The N output of block 214 is connected to block 234, in which all the selected and stored incremented or decremented multipliers are substituted for the previously current multipliers. In block 235, the difference signal Δ on conductor 88 is averaged with a predetermined number of previous such Δ signals from previous interations to form an average difference signal Δ. This prevents momentary cessation of speech from causing a false indication of convergence. In block 236, the average difference signal Δ is compared with the predetermined threshold value which establishes that convergence has taken place, and if Δ is smaller than the threshold, the Y output of block 236 directs the operation to block 238 which sets the convergence line HIGH, followed by end 240. The N output of block 236 directs an end 242. Either end 242 or 240 ends a cycle or iteration of adaptation. The next following cycle of adaptation, if any, is initiated as before by the next clock signal from generator 66 applied to block 210 to set the current stage C to zero so that a new set of incremented or decremented multipliers may be selected.

Figure 3:
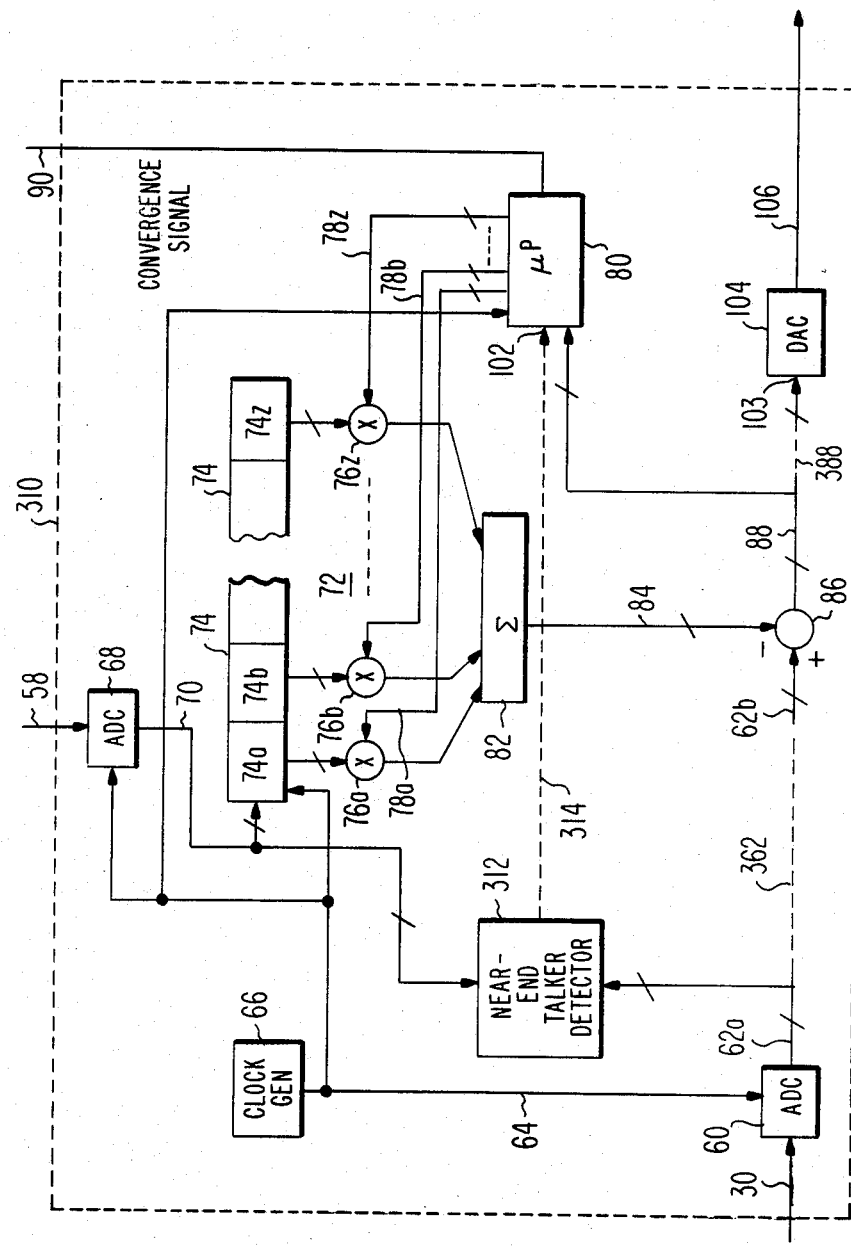
FIG. 3 is a block diagram of a typical telephone echo canceller showing the connections which must be broken for use as part of a room echo canceller according to the invention.

FIG. 3 is a simplified block diagram of a typical commercial echo canceller (EC) such as that described in the aforementioned Messerschmitt article. Those elements in FIG. 3 corresponding to elements of FIG. 1 are designated by the same reference numerals. A comparison of echo canceller 310 of FIG. 3 with the portion of the arrangement of FIG. 1 lying within dotted lines 8 indicates substantial identity between the elements. It will be noted that echo canceller 310 includes a near-end talker detector 312 which receives an input from ADC 68 and from ADC 60. Detector 312 serves no function in the arrangement of FIG. 1 and therefore its output conductor, illustrated as a dotted line 314 may be disconnected from input terminal 102 of microprocessor 80 so that conductor 100 may be connected thereto. Another change which must be made in order to convert EC 310 into the apparatus within dotted line 8 of FIG. 1 is to break conductors 62a and 62b apart as illustrated by dotted lines 362 in order that delay element 88 (FIG. 1) may be interposed between ADC 60 and subtractor 86. Also, the connection of conductor 88 to input terminal 103 of DAC 104 must be broken as illustrated by dotted lines 388, and the input terminal of DAC 104 must be connected to conductor 84 (as in FIG. 1). Such commercial echo cancellers may have sophisticated adaptation algorithms which converge more quickly than the algorithm described in conjunction with FIG. 2.

Other embodiments of the invention will be apparent to those skilled in the art. While the invention has been described in the context of a speakerphone, it will be apparent that a similar apparatus and method may be used to generate one ore more audio signal in a music recording hall subject to undesired echoes.

What is claimed is:

1. A method for reducing the effect of room resonances on the quality of sound transmitted over a speakerphone including a loudspeaker-microphone pair and a handset transmitter-receiver pair, comprising the steps of:

speaking into said transmitter of said handset at a location in said room so that a clean audio signal is generated by said transmitter which is unaffected by said room resonances, and a corresponding audio signal is generated by said microphone which is affected by said room resonances;

delaying said corresponding audio signal to produce a plurality of incrementally delayed samples of said corresponding audio signal;

multiplying each of said incrementally delayed samples of said corresponding audio signal by one of a plurality of multipliers to produce a plurality of multiplied signals;

summing together said multiplied signals to produce a sum signal;

subtracting said sum signal from said clean audio signal to produce a difference signal;

adjusting each of said plurality of multipliers so as to reduce said difference signal towards zero, whereby said sum signal approximates said clean signal;

fixing the values of each of said plurality of multipliers to produce fixed multipliers which multiply said incrementally delayed samples of said corresponding audio signal, whereby said sum signals is said corresponding audio signal corrected for said room resonances;

ceasing speech into said transmitter of said handset after said fixing step;

speaking towards said microphone after said ceasing step; and utilizing said sum signal as the output of said speakerphone.

2. A method according to claim 1 further comprising the steps of digitizing said clean audio and corresponding audio signals, whereby said sum signal is digital.

3. A method according to claim 2 further comprising the step of digital-to-analog converting said sum signal.

4. A method according to claim 1 further comprising the step of delaying said clean audio signal prior to said subtraction step.

5. A method for reducing the effect of room resonances on the quality of sound transmitted over a speakerphone including a loudspeaker-microphone pair and a handset transmitter-receiver pair, comprising the steps of:

speaking into said transmitter of said handset at a location in said room so that a clean audio signal substantially unaffected by said resonances is generated by said transmitter, and a corresponding audio signal is generated by said microphone which is affected by said resonances;

applying said corresponding audio signal to an apparatus including a delay line, controllable taps coupled to said delay line, and a summer coupled to said taps, whereby said corresponding audio signal is delayed to produce a plurality of incrementally delayed audio signals, each of said incrementally delayed audio signals is multiplied by one of a plurality tap values to produce multiplied signals, and said multiplied signals are summed together to produce a sum signal;

subtracting said sum signal produced by said apparatus from said clean audio signal to produce a difference signal;

adjusting each of said plurality of tap values to minimize said difference signal, whereby said apparatus has a transfer function having an effect tending to cancel the effect of said room resonances;

fixing said tap values;

ceasing application of said clean audio signal to said apparatus; and applying said corresponding audio signal to said apparatus, whereby said sum signal represents said corresponding audio signal with the effect of said room resonances substantially reduced.

6. A method according to claim 5, further comprising the steps of digitizing said clean audio signal and said corresponding audio signal.

7. A method according to claim 6, further comprising the step of digital-to-analog converting said sum signal.

8. A method according to claim 5, further comprising the step of delaying said corresponding audio signal by an amount equal to the average delay of said delay line.

9. An apparatus adapted for cancellation of room echoes, comprising:
- a handset including a transmitter adapted for receiving sound at a location in a room for producing clean audio signal unaffected by room resonances;
- a microphone adapted for receiving corresponding sound signals affected by room resonances for producing corresponding audio signals;
- delay means coupled to said microphone for delaying said corresponding audio signals to form a plurality of delayed corresponding signals;
- controllable tap means coupled to said delay means for multiplying each of said delayed corresponding signals by one of a plurality of tap values to form multiplied corresponding signals;
- summing means coupled to said controllable tap means for summing together said multiplied corresponding signals to form a summed signal;
- subtracting means including a first input terminal coupled to said summing means and also including a second input terminal for forming a difference signal representative of the difference between said summed signal and a signal applied to said second input terminal of said subtracting means;
- coupling means coupled to said transmitter and to said second input terminal of said subtracting means for applying said clean audio signal to said second input terminal of said subtracting means, whereby said difference signal represents the difference between said clean audio signal and said summed signal;
- control means coupled to said subtracting means and to said controllable tap means for, in a learning mode of operation, selecting the values of each of said plurality of tap values in such a manner as to reduce the magnitude of said difference signal, and, in a normal mode of operation, for maintaining the values of each of said plurality of tap values at a selected value, whereby said summed signal represents said corresponding audio signal corrected for room resonances; and
- means for coupling said summed signal to a utilization means.

10. Apparatus according to claim 9, wherein said coupling means coupled to said transmitter comprises second delay means having a delay equal to the average delay imparted by said delay means coupled to said microphone.